US010157574B2

(12) United States Patent
Park et al.

(10) Patent No.: US 10,157,574 B2
(45) Date of Patent: Dec. 18, 2018

(54) DISPLAY DEVICE AND DRIVING METHOD THEREOF (71) Applicant: LG DISPLAY CO., LTD., Seoul (KR)

(72) Inventors: Subin Park, Jeonju-si (KR); Wansik Lim, Paju-si (KR); Jungyoup Suk, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 8 days.

(21) Appl. No.: 15/358,975

(22) Filed: Nov. 22, 2016

(65) Prior Publication Data

US 2017/0148390 A1 May 25, 2017

(30) Foreign Application Priority Data

Nov. 24, 2015 (KR) ........................ 10-2015-0164909

(51) Int. Cl.
*G09G 3/3258* (2016.01)
*G09G 3/36* (2006.01)
*G09G 3/3275* (2016.01)
*G06F 3/041* (2006.01)
*G06F 3/044* (2006.01)
*G06F 1/16* (2006.01)
*G06F 1/32* (2006.01)
*G09G 3/3225* (2016.01)
(Continued)

(52) U.S. Cl.
CPC .......... *G09G 3/3258* (2013.01); *G06F 1/163* (2013.01); *G06F 1/3218* (2013.01); *G06F 1/3265* (2013.01); *G06F 1/3296* (2013.01); *G06F 3/044* (2013.01); *G06F 3/0416* (2013.01); *G09G 3/3225* (2013.01); *G09G 3/3275* (2013.01); *G09G 3/3677* (2013.01); *G09G 3/3688* (2013.01); *G04G 9/00* (2013.01); *G09G 3/3266* (2013.01); *G09G 2300/0452* (2013.01); *G09G 2310/06* (2013.01); *G09G 2310/08* (2013.01); *G09G 2320/0233* (2013.01); *G09G 2320/0247* (2013.01); *G09G 2320/0626* (2013.01); *G09G 2320/0673* (2013.01); *G09G 2320/103* (2013.01); *G09G 2330/021* (2013.01); *G09G 2330/028* (2013.01); *G09G 2340/0435* (2013.01); *Y02D 10/153* (2018.01); *Y02D 10/172* (2018.01)

(58) Field of Classification Search
CPC .. G09G 3/3258; G09G 3/3266; G09G 3/3275; G06F 1/163; G06F 1/3218; G06F 1/3265; G06F 3/044
See application file for complete search history.

(56) References Cited

U.S. PATENT DOCUMENTS

2007/0091056 A1* 4/2007 Okita ..................... G09G 3/342
345/102
2007/0229447 A1* 10/2007 Takahara ............. G09G 3/3614
345/102

(Continued)

*Primary Examiner* — Kevin M Nguyen
(74) *Attorney, Agent, or Firm* — Dentons US LLP (57) ABSTRACT Provided are a display device and driving method thereof. A display device comprises a display panel configured to display an image, a data driver configured to supply a data signal to the display panel, a gate driver configured to supply a gate signal to the display panel, a power supply unit configured to output a power voltage to the display panel, and a power saving unit configured to control the power supply unit to vary a level of the power voltage according to a display mode of the display panel.

11 Claims, 11 Drawing Sheets

(51) Int. Cl.
*G09G 3/3266* (2016.01)
*G04G 9/00* (2006.01)

(56) References Cited

U.S. PATENT DOCUMENTS

| | | | | |
|---|---|---|---|---|
| 2009/0109147 A1* | 4/2009 | Park | ......................... | G09G 3/20 |
| | | | | 345/76 |
| 2011/0135114 A1* | 6/2011 | Oba | ...................... | G06F 1/3203 |
| | | | | 345/690 |
| 2012/0182332 A1* | 7/2012 | Liu | ...................... | G09G 3/2007 |
| | | | | 345/691 |
| 2013/0222359 A1* | 8/2013 | Nakata | .................. | G09G 3/3614 |
| | | | | 345/212 |
| 2014/0071105 A1* | 3/2014 | Nakanishi | ............ | G09G 3/3614 |
| | | | | 345/209 |
| 2016/0063928 A1* | 3/2016 | Sakaigawa | ........... | G09G 3/3406 |
| | | | | 345/690 |

* cited by examiner

DISPLAY DEVICE AND DRIVING METHOD THEREOF

This application claims the benefit of Korean Patent Application No. 10-2015-0164909, filed on Nov. 24, 2015, which is incorporated herein by reference for all purposes as if fully set forth herein.

BACKGROUND

Field of the invention

The present disclosure relates to a display device and a driving method thereof.

Discussion of Related Art

With the advancement of information technologies, there is increasing demand for display devices as a medium for a user to connect information. Display devices, such as an Organic Light Emitting Display (OLED), a Quantum Dot Display (QDD), and a Liquid Crystal Display (LCD), and a Plasma Display Panel (PDP), are widely used.

Such a display device includes a display panel having a plurality of subpixels, a driver for outputting a driving signal to drive the display panel, and a power supply unit for supplying power to the driver. A display device may be provided in small, medium, or large size. A display device may have different configurations of display panel, and different driving devices (including periphery devices), and accommodating structures may change according to its size, shape and an application.

Recently, display devices are widely used for various purposes in various conditions. Thus, in an effort to improve the use or driving time, many efforts have been made to reduce power consumption or current consumption.

Conventionally, a display panel is temporarily turned off or luminance is reduced in a display-off period in which an image is not displayed on the display panel to reduce power consumption and improve the use or driving time. In addition, a driving frequency of the display panel may be reduced during the use or driving time.

SUMMARY

Accordingly, the present disclosure is directed to a display device and a driving method thereof that substantially obviate one or more problems due to limitations and disadvantages of the related art.

An advantage of the present disclosure is to provide a display device with reduced power consumption.

Additional features and advantages of the present disclosure will be set forth in the description which follows, and in part will be apparent from the description, or may be learned by practice of the invention. These and other advantages of the present disclosure will be realized and attained by the structure particularly pointed out in the written description and claims hereof as well as the appended drawings.

In one general aspect, there is provided a display device including a display panel configured to display an image, a data driver configured to supply a data signal to the display panel, a gate driver configured to supply a gate signal to the display panel, a power supply unit configured to output a power voltage to the display panel, and a power saving unit configured to control the power supply unit to vary a level of the power voltage according to a display mode of the display panel.

In another general aspect, there is provided a driving method of a display device, including determining whether a display mode of a display panel is a power saving mode; and changing a driving frequency and a driving voltage when the display mode of the display panel is the power saving mode, wherein the changing of the driving frequency and the driving voltage comprises controlling a power supply unit to reduce the driving frequency and vary a level of a power voltage supplied to the display panel.

It is to be understood that both the foregoing general description and the following detailed description are exemplary and explanatory and are intended to provide further explanation of the invention as claimed.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DESCRIPTION OF EXEMPLARY EMBODIMENTS

Reference will now be made in detail embodiments of the invention, examples of which are illustrated in the accompanying drawings.

Hereinafter, embodiments of the present disclosure are described with reference to the accompanying drawings.

<First Embodiment>

Figure 1:
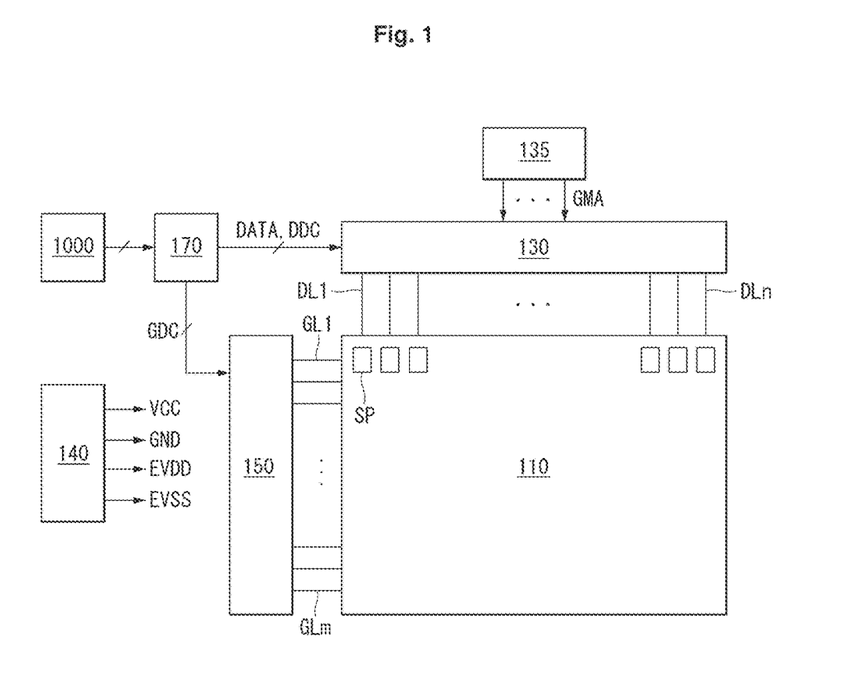
FIG. 1 is a block diagram illustrating a display device according to a first embodiment of the present disclosure.
Figure 2:
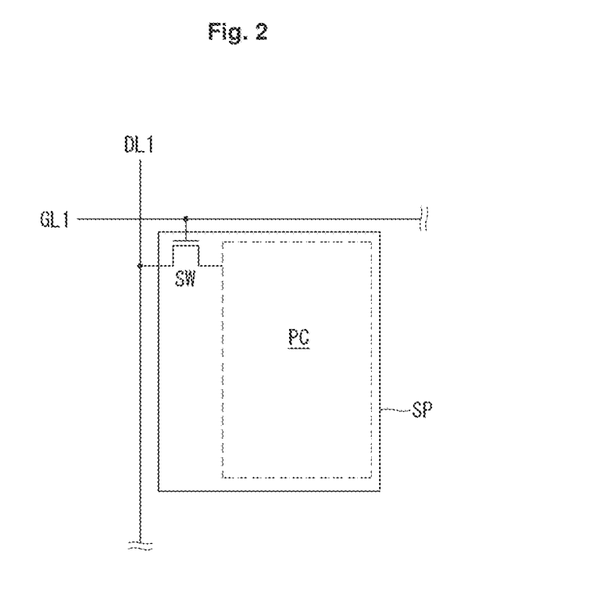
FIG. 2 is a diagram illustrating a configuration of a subpixel shown in FIG. 1.

FIG. 1 is a block diagram illustrating a display device according to a first embodiment of the present disclosure, and FIG. 2 is a diagram illustrating a configuration of a subpixel shown in FIG. 1.

As illustrated in FIG. 1, a display device includes a host system 1000, a timing controller 170, a data driver 130, a power supply unit 140, a gate driver 150, and a display panel 110.

The host system 1000 includes a System on Chip (SoC) having a scaler embedded therein, and converts digital video data of an input image into a data signal suitable for displaying the image on the display panel 110 and output the distal signal. The host system 1000 supplies various timing signals along with the data signal to the controller 170.

The timing controller 170 controls operation timing of the data driver 130 and the gate driver 150 based on timing signals received from the host system 1000, such as a vertical synchronization signal, a horizontal synchronization signal, a data enable signal, and a main clock. The timing controller 170 performs image processing (e.g., data compensation) on a data signal received from the host system 1000 and supplies the resulting signal to the data driver 130.

The data driver 130 operates in response to a first driving signal DDC output from the timing controller 170. The data driver 130 converts a data signal DATA in a digital format received from the timing controller 170 into a data signal in an analog format, and output the resulting signal.

In response to a gamma voltage GMA of a gamma unit 135 disposed inside or outside the data driver 130, the data driver 130 converts a data signal DATA in a digital format into a data signal in an analog format. The data driver 130 supplies data signals to data lines DL1 to DLn of the display panel 110.

The gate driver 150 operates in response to a second drive signal GDC output from the timing controller 170. In response to the second drive signal GDC, the gate driver 150 outputs a gate signal (or a scan signal) of a gate high voltage or a gate low voltage.

The gate driver 150 may sequentially output gate signals in a forward direction or in a reverse direction. The gate driver 150 supplies the gate signals to the gate lines GL1 to GLm of display panel 110.

The power supply unit 140 outputs first and second power voltages for driving the display panel 110, and third and fourth power voltages for driving the data driver 130. In addition, the power supply unit 140 generates voltages to drive the display panel 110, such as a gate high voltage and a gate low voltage which are to be transmitted to the gate driver 150.

The display panel 110 includes subpixels SP, the data lines DL1 to DLn connected to the subpixels SP, and the gate lines GL1 to GLm connected to the subpixels SP. The display panel displays an image in response to a gate signal output from the gate driver 150 and a data signal DATA output from the data driver 130. The display panel 110 includes a lower substrate and an upper substrate. The subpixels SP are formed between the lower substrate and the upper substrate.

As illustrated in FIG. 2, one subpixel includes a switching thin film transistor SW connected to (or formed at an intersection of) a gate line GL1 and a data line DL, and a pixel circuit PC which operates in response to a data signal DATA supplied through the switching thin film transistor SW.

The display panel 110 is implemented as a liquid crystal display panel or an organic light emitting display panel according to the configuration of the pixel circuits PC of the subpixels SP. When the display panel 110 is implemented as a liquid crystal display panel, the display panel 110 operates in a Twisted Nematic (TN) mode, Vertical Alignment (VA) mode, an In Plane Switching (IPS) mode, a Fringe Field Switching (FFS) mode, or an Electrically Controlled Birefringence (ECB) mode.

When the display panel 110 is implemented as an organic light emitting display panel, the display panel 110 may be implemented as a top-emission type, a bottom-emission type, or a dual-emission type.

The aforementioned display device may be implemented as a television, a set-top box, a navigation system, a video player, a Blu-ray player, a personal computer (PC), a wearable device, a home theater, a mobile phone, etc. In addition, the display panel of the display device may be selected from among a liquid crystal display panel, an organic light emitting display panel, electrophoretic indication display, a quantum dot display panel, and a plasma display panel. For convenience of explanation, an organic light emitting display panel is depicted as a display panel of the display device in the following.

The display panel described in the following may be provided in small, medium, or large size. In the following, however, a small-size display device is taken as an example, for which reduction in power consumption is more beneficial than medium or large display devices.

Hereinafter, a smart watch is depicted as an example of a small-sized display device which is an embodiment of the present disclosure. In addition, subpixels are red, green, and blue subpixels (RGB). However, aspects of the present disclosure are not limited thereto.

Figure 3:
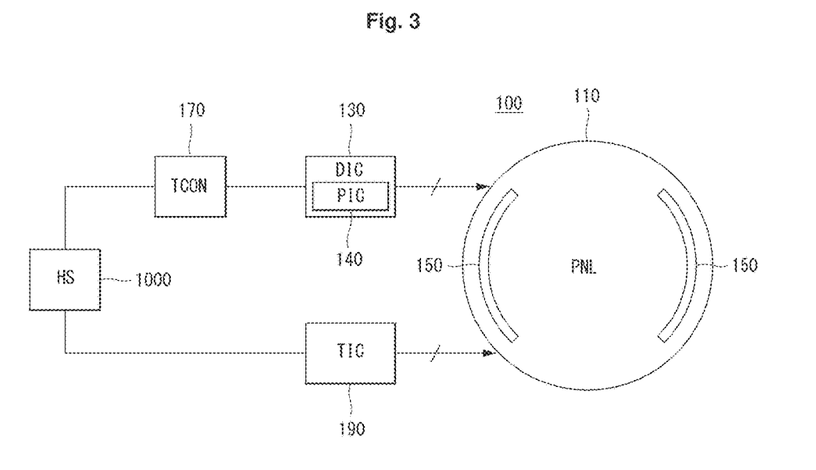
FIG. 3 is a block diagram illustrating a display device of a smart watch according to a first embodiment of the present disclosure.
Figure 4:
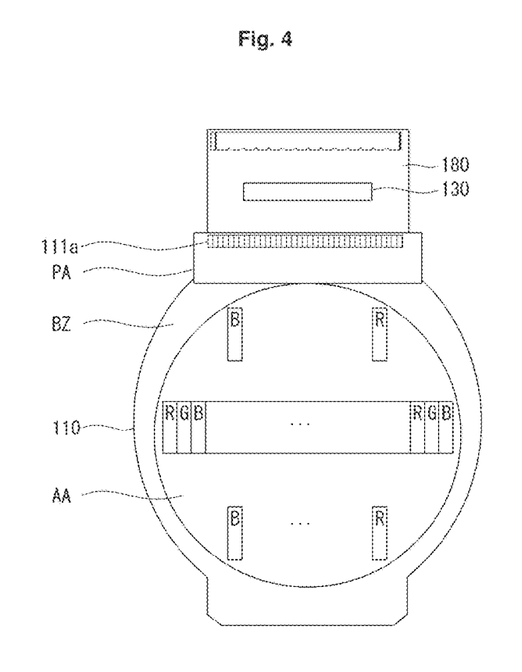
FIG. 4 is a top plan view of a display panel of the smart watch shown in FIG. 3.
Figure 5:
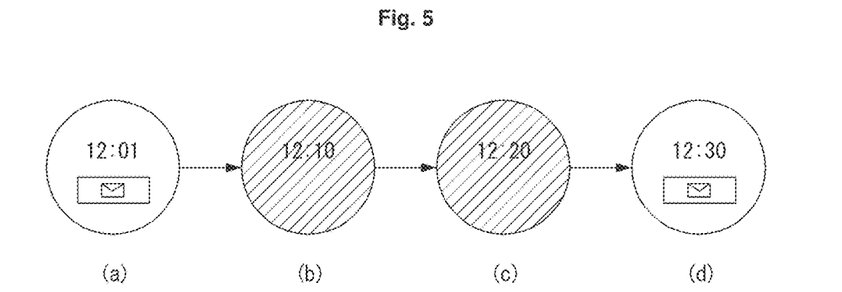
FIG. 5 is a diagram illustrating how a display panel is changed according to a consumption power saving method.

FIG. 3 is a block diagram illustrating a display device of a smart watch according to a first embodiment of the present disclosure, FIG. 4 is a top plan view of a display panel of the smart watch shown in FIG. 3, and FIG. 5 is a diagram illustrating how a display panel is changed according to a consumption power saving method.

As illustrated in FIG. 3, a smart watch 100 includes a host system HS 1000, a timing controller TCON 170, a data driver DIC 130, a power supply PIC 140, a gate driver 150, and a display panel PNL 110.

The smart watch 100 is a small-sized display device. Some components of a small-sized display device are integrated in order to reduce complexity of the device. For example, the power supply unit 140 is included in the data driver 130. However, this is merely exemplary, and the small-sized device may be implemented in various ways. That is, in another example, the timing controller 170 and the data driver 130 may be integrated as one body.

In addition, the gate driver 150 is embedded in the display panel 110 along with a pixel array. The gate driver 150 embedded in the display panel 110 is formed as a Gate In Panel (GIP) type by a thin film transistor process.

The smart watch 100 includes a touch driver 190 which is a touch-type input means to assist a user to apply an input. In addition, the display panel 110 includes touch sensors for sensing a location of a touch input using the touch drive 190, and sensor lines which electrically connect the touch sensors and the touch driver 190.

The touch driver 190 detects touch location information of a finger with a touch sensor that is implemented as a self-capacitive touch sensor or mutual-capacitive touch sensor. The touch driver 190 transmits the detected touch location information of a finger to the host system 1000. The host system 1000 executes an application program that is associated with the touch location information received from the touch driver 190.

As illustrated in FIG. 4, the touch panel 110 has, for example, a round shape. However, it is merely exemplary, and the display panel 110 may be in various shapes, such as a square, a rectangle, a polygon, and an eclipse.

Red, green, and blue subpixels (R,G,B) and touch sensors (not shown) are disposed on a display area of the display panel. A pad part 111*a* may be disposed on a non-display area (or a bezel area) BZ of the display panel 110. The pad part 111a is depicted as being disposed in the upper area of the display area AA, but it may be also disposed in the lower area of the display area AA.

The display driver 130 is mounted on a flexible printed circuit board (film) 180. The flexible printed circuit board 180 is electrically connected to the pad part 111a, for example, by an anisotropic conductive film (ACF). Not only the data driver 130, but also other components to drive the display panel 110 may be further mounted on the flexible printed circuit board 180.

As illustrated in FIG. 5, to improve a use time (driving time), a small- or medium-sized display device temporarily turns off a display panel or reduces luminance in a display-off period in which an image is not displayed on the display panel. In addition, in this period, a driving frequency of the display panel may be reduced.

In FIG. 5, the periods a and d corresponding to a display-on period in which an image is displayed on the display panel may be defined as a normal mode because normal driving operation is performed in this period. On the other hand, the periods b and c corresponding to a display-off period in which an image is not displayed on the display panel may be defined as a power saving mode because power saving operation is performed in this period.

Recently, display panels are being used for various purposes in various conditions. Many efforts have been made to reduce power consumption (current consumption) in an effort to increase a use time (driving time) of the display device. However, there are some problems that the conventional method fails to solve.

Hereinafter, there are provided descriptions about a configuration of a power saving unit for reducing power consumption according to a first embodiment of the present disclosure.

Figure 6:
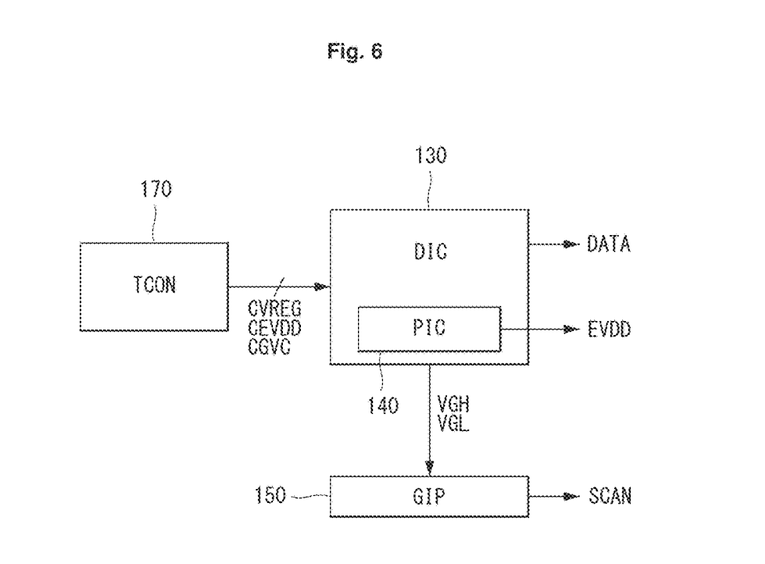
FIG. 6 is a diagram illustrating an example of a device according to a first embodiment of the present disclosure.
Figure 7:
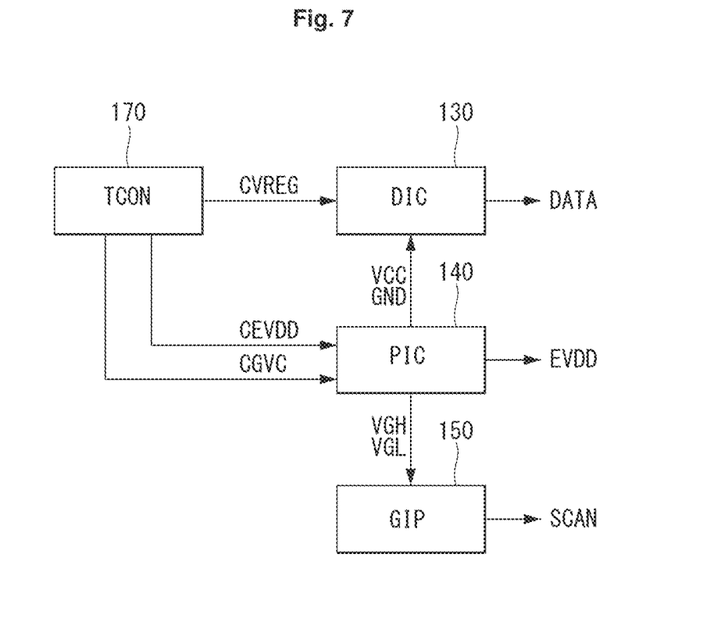
FIG. 7 is a diagram illustrating an example of a device according to a variation of the first embodiment of the present disclosure.

FIG. 6 is a diagram illustrating an example of a device according to a first embodiment of the present disclosure, and FIG. 7 is a diagram illustrating an example of a device according to a variation of the first embodiment of the present disclosure.

As illustrated in FIG. 6, a timing controller 170 according to the first embodiment of the present disclosure outputs a gamma voltage change signal CVREG, a first power voltage change signal CEVDD, and a gate voltage change signal CGVC.

The gamma voltage change signal CVREG, the first power voltage change signal CEVDD, and the gate voltage change signal CGVC output from the timing controller 170 are transferred to a data driver 130. A power supply unit 140 is disposed inside the data driver 130. Therefore, the gamma voltage change signal CVREG output from the timing controller 170 is supplied to the data driver 130, whereas the first power voltage change signal CEVDD and the gate voltage change signal CGVC are supplied to the power supply unit 140.

As illustrated in FIG. 7, a timing controller 170 according to the variation of the first embodiment of the present disclosure outputs a gamma voltage change signal CVREG, a first power voltage change signal CEVDD, and a gate voltage change signal CGVC.

The gamma voltage change signal CVREG output from the timing controller 170 is supplied to a data driver 130. The first power voltage change signal CEVDD and the gate voltage change signal CGVC output from the timing controller 170 are supplied to a power supply unit 140.

Based on third and fourth power voltages VCC and GND output from the power supply unit 140, the data driver 130 generates a reference voltage to be supplied to a gamma unit.

As illustrated in FIGS. 6 and 7, the gamma voltage change signal CVREG is defined as a signal for changing a level of a reference voltage supplied to the gamma unit (the gamma unit is depicted as being, for example, included in a data driver) The first power voltage change signal CEVDD is defined as a signal for changing a level of a first power voltage output from the power supply unit 140. The gate voltage change signal CGVC is defined as a signal for changing a level of a gate high voltage VGH and a gate low voltage VGL output from the power supply unit 140.

The data driver 130 increases or decreases a level of a reference voltage (e.g., VREG1OUT) to be supplied to the gamma unit in response to the gamma voltage change signal CVREG. If the level of the reference voltage (VREG1OUT) to be supplied to the gamma unit is varied, a level of a voltage divided in response to the reference voltage (e.g., VREG1OUT) and a level of a data voltage converted in response to the reference voltage (e.g., VREG1OUT) are varied, and therefore, luminance of the display panel is varied as well. That is, a level of a data signal DATA (hereinafter, referred to as a data voltage) output from the data driver 130 is varied.

The power supply unit 140 increases or decreases the level of the first power voltage EVDD in response to the first power voltage change signal CEVDD. If the level of the first power voltage EVDD is varied, a driving voltage supplied to, for example, an organic light emitting diode is varied as well, and therefore, luminance of the display panel is varied well.

The power supply unit 140 increases or decreases the levels of the gate high voltage VGH and the gate low voltage VGL in response to the gate voltage change signal CGVC. If the levels of the gate high voltage VGH and the gate low voltage VGL are varied, an on/off voltage of, for example, a switching transistor is varied, and therefore, luminance of the display panel is varied as well.

Meanwhile, the timing controller may analyze a data signal which is input to output the above change signals, and may output at least of the change signals. For example, the timing controller 170 may output the above change signals when (1) an image consisting of repetitive still images, (2) an image, a specific part (specific line) of which shows nothing constantly, (3) an image predetermined by a user, (4) an image for screen saving are displayed on the display panel. However, aspects of the present disclosure are not limited thereto. In addition, the timing controller 170 may vary other control signals in order to output the above change signals at appropriate timings (section or time).

The aforementioned configuration of the device and the operation of varying a voltage level are performed when the display panel is transitioned from a normal mode to an power saving mode or from the power saving mode to the normal mode.

More specifically, when the normal mode is transitioned to the power saving mode, or vice versa, an embodiment of the present disclosure varies a level of a driving voltage as well as a driving frequency to reduce or prevent a drastic change in luminance or pattern change.

To seek for a voltage varying method that does not cause a drastic change in luminance, pattern change, and flashing when a driving mode is transitioned, experiments have been conducted on the device shown in FIG. 6 using a voltage varying method according to an embodiment of the present disclosure is derived. Hereinafter, the problems of an experiment example are explored, and the embodiments of the present disclosure for solving the problem are described.

Figure 8:
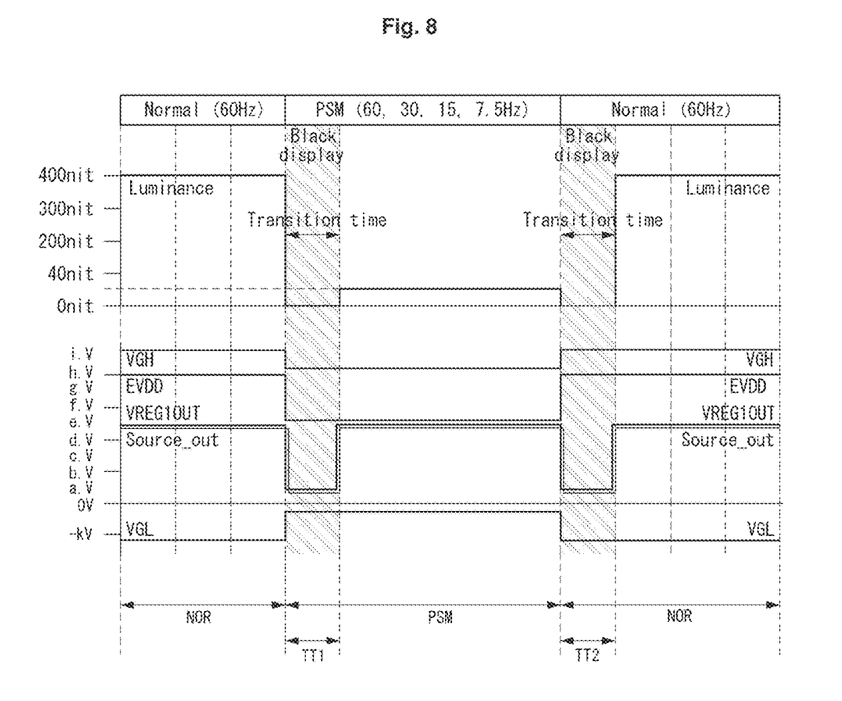
FIG. 8 is a luminance and voltage waveform view according to an experiment example.
Figure 9:
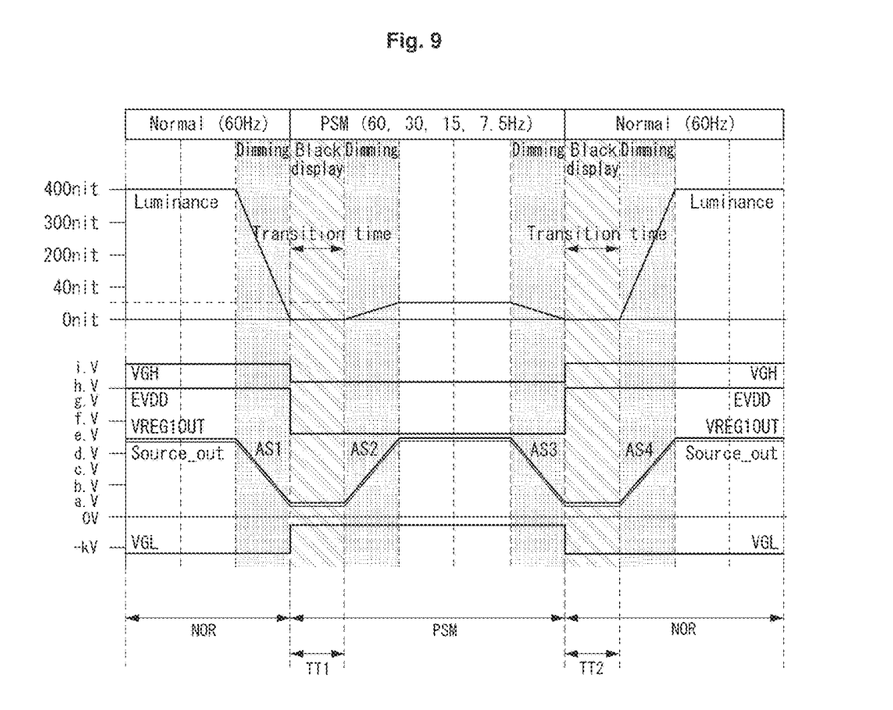
FIG. 9 is a luminance and voltage waveform view according to a first embodiment of the present disclosure.
Figure 10:
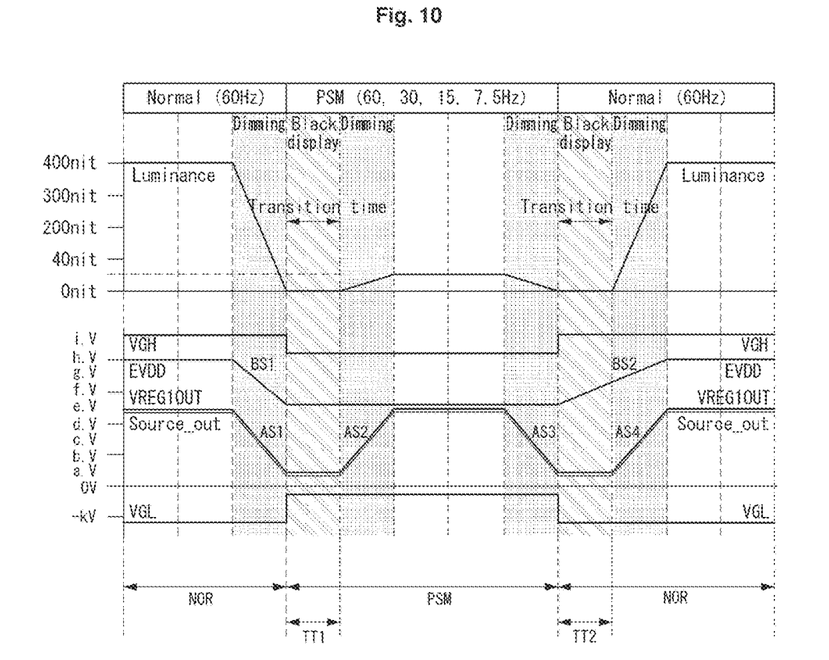
FIG. 10 is a luminance and voltage waveform view according to a second embodiment of the present disclosure.
Figure 11:
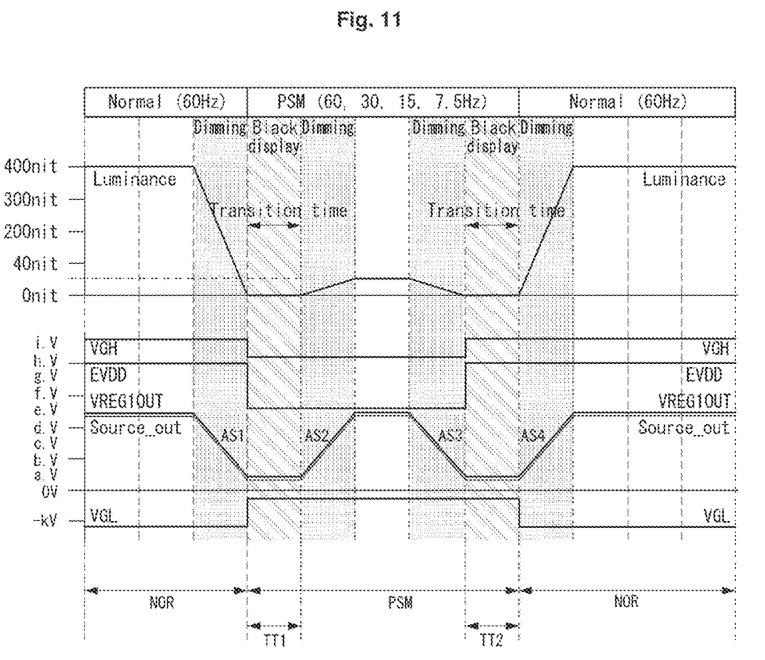
FIG. 11 is a luminance and voltage waveform view according to a third embodiment of the present disclosure.
Figure 12:
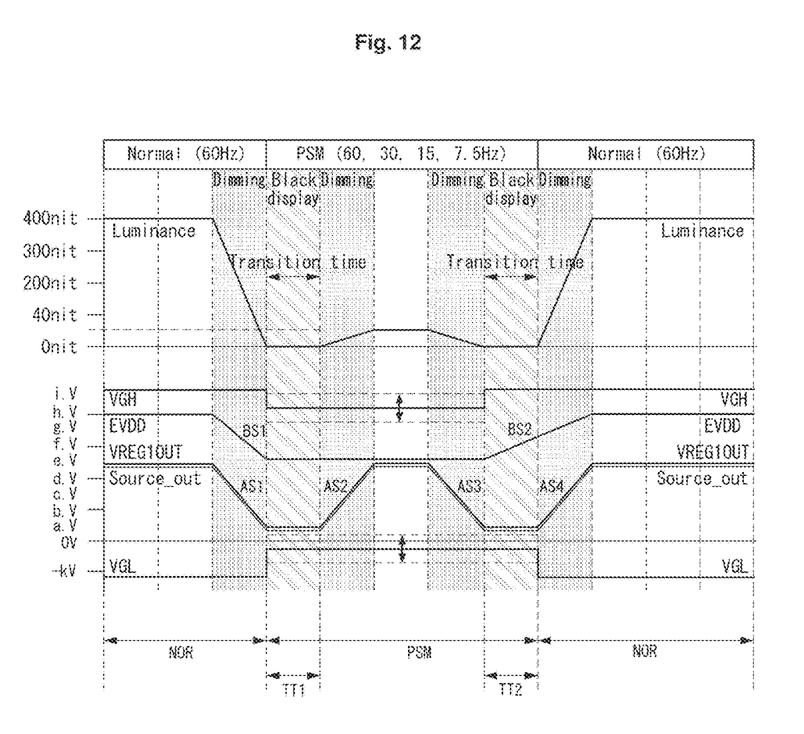
FIG. 12 is a luminance and voltage waveform view according to a fourth embodiment of the present disclosure.
Figure 13:
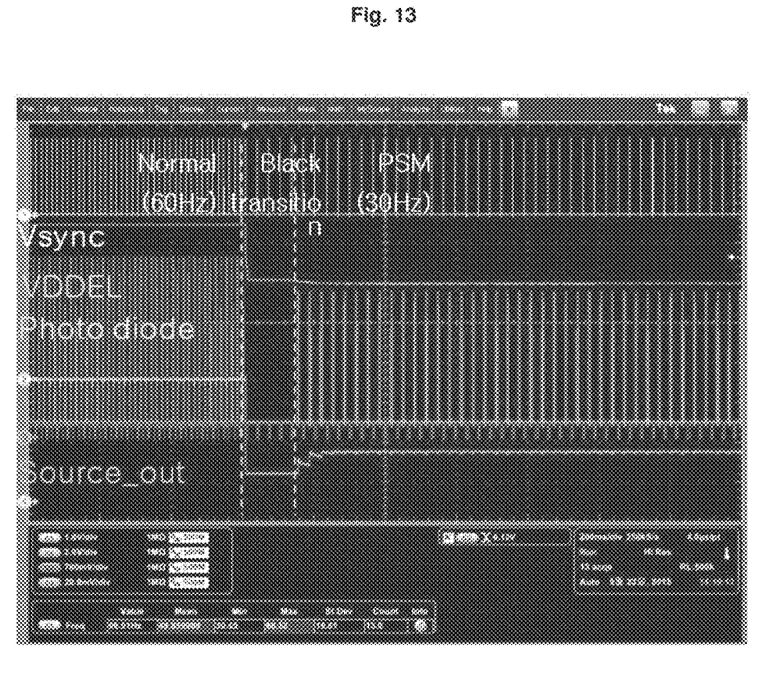
FIG. 13 is a simulation result showing luminance and voltage waveforms according to the experiment example.
Figure 14:
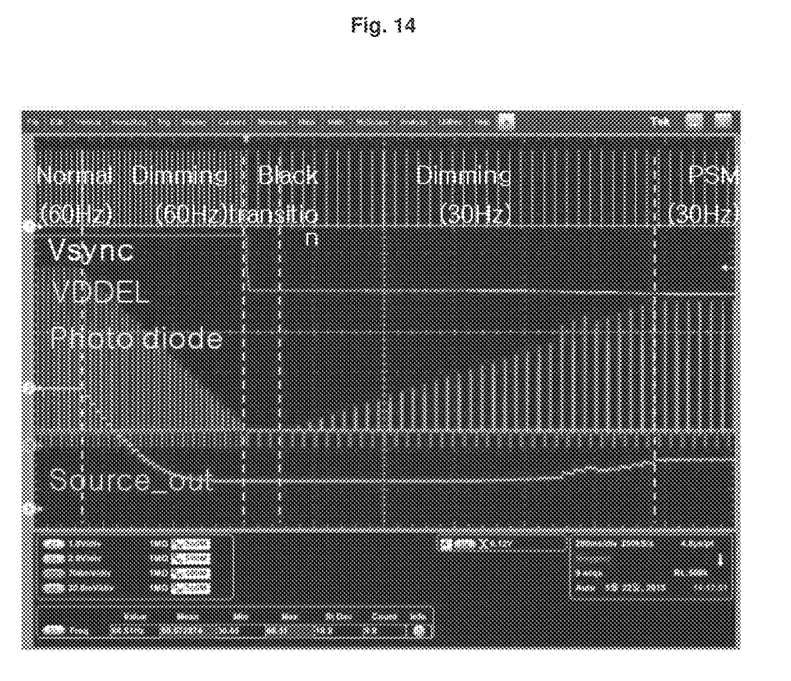
FIG. 14 is a simulation result showing luminance and voltage waveforms according to the first embodiment of the present disclosure.

FIG. 8 is a luminance and voltage waveform view according to an experiment example, FIG. 9 is a luminance and voltage waveform view according to a first embodiment of the present disclosure, FIG. 10 is a luminance and voltage waveform view according to a second embodiment of the present disclosure, FIG. 11 is a luminance and voltage waveform view according to a third embodiment of the present disclosure, FIG. 12 is a luminance and voltage waveform view according to a fourth embodiment of the present disclosure, FIG. 13 is a simulation result showing luminance and voltage waveforms according to the experiment example, and FIG. 14 is a simulation result showing luminance and voltage waveforms according to the first embodiment of the present disclosure.

In the following, the voltage transition method is implemented is on the device shown in FIG. 6, but it may be implemented on the device shown in FIG. 7 or any device similar thereto.

As illustrated in FIG. 8, in the experiment example, a level of a driving voltage as well as a driving frequency is varied to prevent a drastic change in luminance, pattern change, and flashing when a driving mode is transitioned.

A driving frequency per frame in a normal mode NOR is 60 Hz. If a driving mode is transitioned from the normal mode NOR to a power saving mode PSM, the driving frequency per frame is gradually reduced. In this case, the driving frequency may be varied in order of 60 Hz, 30 Hz, 15 Hz, and 7.5 Hz, but aspects of the present disclosure are not limited.

However, if the driving mode is switched again from the input current saving mode PSM to the normal mode NOR, the driving frequency may return directly to 60 Hz or may increase gradually. In this case, the driving frequency may be varied in order of 7.5 Hz, 15 Hz, 30 Hz, and 60 Hz, which is in reverse of the above order, but aspects of the present disclosure are not limited thereto.

In the experiment example, when a driving mode of a display panel is transitioned from the normal mode NOR to the power saving mode PSM, or vice versa, a driving frequency is varied from a high frequency to a low frequency, or vice versa.

According to the experiment result, once a driving frequency is varied when the driving mode is transitioned, a drastic change in luminance and pattern change are recognized, thereby causing flashing or flickering.

To solve this problem, a period for displaying black (a black display period) is inserted into periods in which luminance is changed (during one frame or two frames) in the experiment example, and detailed description thereof is provided as below.

A black display period for displaying black on the display is inserted into a transition time period TT1 in which the driving mode is transitioned from the normal mode NOR to the power saving mode PSM or a transition time period TT2 in which the driving mode is transitioned from the power saving mode PMS to the normal node NOR. During each of the transition time periods TT1 and TT2, a level of a gate high voltage VGH, a level of a first power voltage EVDD, and a level of a reference voltage VREG1OUT are immediately reduced. On the other hand, a level of the gate low voltage VGL is increased during each of the transition periods TT1 and TT2.

Take an example in which the gate high voltage VGH is set as iV, the first power voltage EVDD is set as hV, and the reference voltage VREG1OUT and a data voltage Source_out each is set to be between eV and dV, and the gate low voltage is set as –kV which is below 0V. As illustrated in drawings, iV is the highest positive polarity voltage, and –kV is the lowest negative polarity voltage.

As shown in the experiment example, if a level of a driving voltage is varied in the transition time periods TT1 and TT2 in which a driving mode is transitioned, a drastic change in luminance and pattern change are solved, which is regarded somewhat improvement in comparison with the previous experiments. However, this method may be effective only in addressing the drastic change in luminance, not in solving the occurrence of flashing during a black display period.

In conclusion, the driving voltage affects luminance of the display panel, so the voltage varying method of immediately changing a driving voltage is not effective enough to address the flashing problem.

As illustrated in FIG. 9, in the first embodiment of the present disclosure, but a level of a driving voltage as well as a driving frequency is varied not to cause a drastic change in luminance and pattern change when a driving mode is transitioned.

In order to implement a display device in the manner shown in the first embodiment of the present disclosure, the device is driven in the following manner.

First, an input image is analyzed to determine whether a display mode of a display panel is a power saving mode (determination step). Then, if the display mode of the display panel corresponds to the power saving mode, a signal is output to change a driving voltage as well as a driving frequency according to characteristics of the image (varying step). Hereinafter, detailed description thereof is provided based on a waveform.

A driving frequency per frame in the normal mode NOR is 60 Hz. If the driving mode is transitioned from the normal mode NOR to the power saving mode PSM, the driving frequency per frame is reduced. In this case, the driving frequency may be varied in the order of 60 Hz, 30 Hz, 15 Hz, and 7.5 Hz, but aspects of the present disclosure are not limited thereto.

If the power saving mode is transitioned to the normal mode NOR, the driving frequency per frame may return directly to 60 Hz or may be increased gradually. In this case, the driving frequency may be varied in order of 7.5 Hz, 15 Hz, 30 Hz, and 60 Hz, which is in reverse of the above order, but aspects of the present disclosure are not limited thereto.

A black display period for displaying black on the display panel is inserted into the transition time period TT1 in which the driving mode is transitioned from the normal mode NOR to the power saving mode PSM or the transition time period TT2 in which the driving mode is transitioned from the input current saving mode PSM to the normal mode NOR.

Into each of the transition times TT1 and TT2, there is inserted a period in which a level of a gate high voltage VGH, a level of a first power voltage EVDD, and a level of a reference voltage VREG1OUT are reduced immediately. On the other hand, a level of a gate low voltage VGL is increased in the transition time periods TT1 and TT2.

Take an example that the gate high voltage VGH is set as iV, the first power voltage EVDD is set as hV, the reference voltage VREG1OUT and a data voltage are set to be a voltage between eV and dV, and the gate low voltage VGL is set as –kV below 0V.

As illustrated in drawings, iV is the highest positive polarity voltage, and –kV is the lowest negative polarity voltage. Due to the above voltages, luminance of the display panel may appear to be 400 nit in the normal mode NOR and 0 nit in the transition time periods TT1 and TT2. However, aspects of the present disclosure are not limited thereto.

In the first embodiment, a level of a driving voltage is gradually varied in periods before and after the transition time periods TT1 and TT2 in which a driving mode is transitioned. For example, a level of the reference voltage VREG1OUT is varied gradually in periods before and after the transition time periods TT1 and TT2. The first transition time period TT1 is located at the beginning of the power saving mode PSM, and the second transition time period TT2 is located at the beginning of the normal mode NOR.

In the normal mode NOR, in a time period before the first transition time period TT1 for entering the input power saving mode PSM, the reference voltage VREG1OUT is gradually reduced to achieve an A1 gradient (AS1). In a time period after the first transition time period TT1, the reference voltage VREG1OUT is gradually increased to achieve an A2 gradient (AS2).

In the input current saving mode PSM, the gate high voltage VGH and the first power voltage EVDD is reduced than before, whereas the gate low voltage VGL is increased than before. Therefore, in the input current saving mode PSM, the reference voltage VREG1OUT may be set to remain at the reduced level in the power saving mode PSM. However, as illustrated in the drawing, the reference voltage VREG1OUT may be set to remain at the same as the level of the normal mode NOR for a predetermined period of time. In this case, luminance of the display panel may increase bit more compared to the first transition time period TT1 (Example: 0 nit−>40 nit).

In a time period before the second time transition period TT2 in which the power saving mode PSM enters the normal mode NOR, the reference voltage VREG1OUT is gradually reduced to have an A3 gradient (AS3). In a time period after the second time period TT2, the reference voltage VRE1OUT is gradually increased to have an A4 gradient (AS4).

In the normal mode NOR, the bate high voltage VGH and the first power voltage EVDD is increased than before, and the gate low voltage VGL is decreased than before. Therefore, in the normal mode NOR, the gate high voltage VGH, the first power voltage EVDD, the reference voltage VREG1OUT, and the gate low voltage VGL all return to a generally normal level to drive a display panel.

As above, in the case of transition of a driving mode in the first embodiment of the present disclosure, a gradual variation is operated by dimming a driving voltage as well as a driving frequency. According to experiment results, the first embodiment of the present disclosure has proved that such smooth mode transition solves the problems caused by a drastic change in luminance, pattern change, flashing, or flickering.

Beside the above function, the first embodiment of the present disclosure is able to add a function of increasing a voltage level when dimming a driving voltage, and a function of performing turning on/off operation in response to a specific voltage. In addition, a frame option may be added when a driving voltage is dimmed, and thus it is possible to performing dimming on a basis of N frame unit (N is an integer equal to or greater than 1) or according to transition of a driving mode by a user.

In addition, it is possible to select the number of frames used in the black display period (which means it is possible to vary the black display period). In addition, through insertion of an off option, the display period may be removed. In an black transition off operation for removal of the black display period, occurrence of flashing may be minimized Hereinafter, other embodiments are described in which a driving frequency and a driving voltage are varied gradually. However, the following other embodiments are based on the first embodiment, so mainly the differences from the first embodiment are described.

<Second Embodiment>

As illustrated in FIG. 10, in the second embodiment, the level of a driving voltage as well as a driving frequency is varied to prevent a drastic change in luminance, pattern change, and flashing when a driving mode is transitioned.

In the second embodiment, the level of a driving voltage is varied gradually in time periods before and after the transition time periods TT1 and TT2 in which a driving mode is transitioned. For example, in the time periods before and after the transition time periods TT1 and TT2, a level of a reference voltage VREG1OUT and a level of a first power voltage EVDD are gradually varied. The first transition time period TT1 is located at the beginning of the power saving mode PSM, and the second transition time period TT2 is located at the beginning of the normal mode NOR.

In a time period before the first transition time period TT1 in which the normal mode NOR enters the power saving mode PSM, the reference voltage VREG1OUT is gradually reduced to have an A1 gradient (AS1). In addition, the first power voltage EVDD is gradually decreased to have a B1 gradient (BS1).

In a time period after the first transition time period TT1, the reference voltage VREG1OUT is gradually increased to have an Al gradient (AS2). The first power voltage EVDD is reduced to a target reduction level and remains at the target reduction level in the power saving mode PSM. The target reduction level is any voltage lower than a voltage in the normal mode NOR, and is determined to have an appropriate voltage value through preliminary experiments.

In a time period before the second transition time period TT2 in which the power saving mode PSM enters the normal mode NOR, the reference voltage VREG1OUT is gradually reduced to have an A3 gradient (AS3). In addition, the first power voltage EVDD is gradually increased to have a B2 gradient (BS2).

In a time period after the second transition time period TT2, the reference voltage VREG1OUT is gradually increased to have an A4 gradient (AS4). The first power voltage EVDD remains at an original voltage level in the normal mode NOR.

In the above description, the B1 gradient (BS1) is steeper than the B2 gradient (BS2). However, this is merely exemplary, and the B1 gradient (BS1) and the B2 gradient (BS2) may be changed in at least one period according to a display method of a display panel or an optimization procedure.

<Third Embodiment>

As illustrated in FIG. 11, in the third embodiment, the level of a driving voltage as well as a driving frequency is varied to prevent a drastic change in luminance, pattern change, and flashing when a driving mode is transitioned.

In the third embodiment, the level of a driving voltage is varied gradually in time periods before and after the transition time periods TT1 and TT2 in which a driving mode is transitioned. For example, in the time periods before and after the transition time periods TT1 and TT2, a level of a reference voltage VREG1OUT is gradually varied, and a level of a first power voltage EVDD is immediately varied. The first transition time period TT1 is located at the beginning of the power saving mode PSM, and the second transition time period TT2 is located at the end of the power saving mode PSM.

In a time period before the first transition time period TT1, the reference voltage VREG1Out is gradually reduced to have an A1 gradient (As1). The first power voltage EVDD is immediately decreased. In a time period after the first transition time period TT1, the reference voltage VREG1OUT is gradually increased to have an A2 gradient (As2). The first power voltage EVDD decreases to a target reduction level and remains at the target reduction level in the power saving mode PSM.

In a time period before the second transition time period TT2, the reference voltage VREG1OUT is gradually decreased to have an A3 gradient (AS3). The first power voltage EVDD is immediately increased to remain at an original level. In a time period after the second transition time period TT2, the reference voltage VREG1OUT is gradually increased to have an A4 gradient (AS4). The first power voltage EVDD remains at the original level.

<Fourth Embodiment>

As illustrated in FIG. 12, in the fourth embodiment, the level of a driving voltage as well as a driving frequency is varied to prevent a drastic change in luminance, pattern change, and flashing when a driving mode is transitioned.

In the third embodiment, the level of a driving voltage is varied gradually in time periods before and after the transition time periods TT1 and TT2 in which a driving mode is transitioned. For example, in the time periods before and after the transition time periods TT1 and TT2, a level of a reference voltage VREG1OUT and a level of a first power voltage EVDD are gradually varied. The first transition time period TT1 is located at the beginning of the power saving mode PSM, and the second transition time period TT2 is located at the end of the power saving mode PSM.

In a time period before the first transition time period TT1, the reference voltage VREG1OUT is gradually reduced to have an A1 gradient (AS1). The first power voltage EVDD is gradually reduced to have a B1 gradient (BS1).

In a time period after the first transition time period TT1, the reference voltage VREG1OUT is gradually increased to have an A2 gradient (AS2). The first power voltage EVDD is reduced to a target reduction level and remains at the target reduction level in the power saving mode PSM.

In a time period before the second transition time period TT2, the reference voltage VREG1OUT is gradually reduced to have an A3 gradient (AS3). The first power voltage EVDD is gradually increased to have a B2 gradient (BS2) to correspond to a period in which varying the reference voltage VREG1Out is finished. The B2 gradient (BS2) has a slighter gradient angle than that of the B1 gradient (BS1).

In a time period after the second transition time period TT2, the reference voltage VREG1Out is gradually increased to have an A4 gradient (AS4). The first power voltage EVDD is gradually increased from a point at which the increase in the level of the reference voltage VREG1OUT ends to a point at which the increase in the level of the reference voltage VREG1OUT ends.

As illustrated in the first to fourth embodiments of the present disclosure, a location of each transition time period TT1 or TT2, a gradient of the first power voltage EVDD, and a gradient of the reference voltage VREG1OUT may be changed by smooth mode transition, a display method of a display panel, or an optimization procedure. For example, the locations of the first transition time period TT1 and the second transition time period TT2 may be changed. In addition, the B1 gradient (BS1) and the B2 gradient (BS2) at which the level of the first power voltage EVDD is varied may be changed to be the same or different from each other.

Furthermore, the A1 gradient (AS1) and the A2 gradient (AS2) at which the level of the reference voltage VREG1OUT is varied may be changed to be the same or different from each other.

As described above, an embodiment of the present disclosure is able to reduce or prevent flashing or flickering when transition of a driving mode of a display panel for power saving purpose, and to transition a driving mode (or change a screen) smoothly. In addition, an embodiment of the present disclosure is able to reduce power consumption and improve display quality by dimming a driving voltage as well as a driving frequency.

What is claimed is:

1. A display device comprising:
a display panel configured to display an image;
a data driver configured to supply a data signal to the display panel;
a gate driver configured to supply a gate signal to the display panel;
a power supply circuit configured to output a power voltage to the display panel; and
a power saving circuit configured to control the power supply circuit to vary a level of the power voltage according to a display mode of the display panel,
wherein during each of transition periods when the display mode of the display panel is transitioned from a normal mode to a power saving mode and from the power saving mode to the normal mode, a driving frequency of the display panel is changed, the display panel displays a black, and at least one of the power voltage of the display panel, the gate signal of the display panel and a reference voltage of a gamma circuit is changed.

2. The display device of claim 1, wherein the power saving circuit outputs a power voltage change signal to gradually decrease or increase the level of the power voltage in a period in which the display mode of the display panel is transitioned from the normal mode to the power saving mode or from the power saving mode to the normal mode.

3. The display device of claim 1, wherein the power saving circuit outputs a power voltage change signal to immediately decrease or increase the level of the power voltage in a period in which the display mode of the display panel is transitioned from the normal mode to the power saving mode or from the power saving mode to the normal mode.

4. The display device of claims 1, wherein the level of the power voltage is reduced to a target level in the period in which the display mode of the display panel is transitioned, and then remains at the target level in the power saving mode.

5. The display device of claim 1, wherein the power saving circuit outputs a gamma voltage change signal to gradually decrease or increase a level of the reference voltage of the gamma circuit, which provides the gamma voltage to the data driver, in a period in which the display mode of the display panel is transitioned from the normal mode to the power saving mode or from the power saving mode to the normal mode.

6. The display device of claim 1, wherein the power saving circuit outputs one of the following signals:
a power voltage change signal to vary the level of the power voltage;
a gamma voltage change signal to vary a level of the reference voltage of a gamma circuit which provides the gamma voltage to the data driver; and a gate voltage change signal to vary levels of a gate high voltage and a gate low voltage of the gate signal.

7. The display device of claim 1, wherein the display panel displays the black with a dimming period, the dimming period is performed before and after displaying the black.

8. The display device of claim 1, wherein a period for displaying black is equal to or greater than one frame interval.

9. A driving method of a display device, comprising:
determining whether a display mode of a display panel is a power saving mode or a normal mode; and
changing a driving condition during each of transition periods when the display mode of the display panel is transitioned from a normal mode to a power saving mode and from the power saving mode to the normal mode,
wherein the changing the driving condition comprises a driving frequency of the display panel is changed, the display panel displays a black, and at least one of the power voltage of the display panel, the gate signal of the display panel and a reference voltage of a gamma circuit is changed.

10. The driving method of claim 9, wherein the changing condition comprises gradually decreasing or increasing the level of the power voltage in a period in which the display mode of the display panel is transitioned from the normal mode to the power saving mode or from the power saving mode to the normal mode.

11. The driving method of claim 9, wherein the changing condition comprises gradually decreasing or increasing a level of the reference voltage of the gamma circuit, which provides the gamma voltage to a data driver, in a period in which the display mode of the display panel is transitioned from the normal mode to the power saving mode or from the power saving mode to the normal mode.

* * * * *